US012613004B2

(12) United States Patent
Kim

(10) Patent No.: US 12,613,004 B2
(45) Date of Patent: Apr. 28, 2026

(54) NITROGEN COMPRESSION SYSTEM FOR LEAKAGE TEST ON GAS PIPELINE USED FOR ENGINE AND VESSEL INCLUDING THE SAME

(71) Applicant: DAEWOO SHIPBUILDING & MARINE ENGINEERING CO., LTD., Geoje-si (KR)

(72) Inventor: Jong Hyun Kim, Geoje-si (KR)

(73) Assignee: DAEWOO SHIPBUILDING & MARINE ENGINEERING CO., LTD., Geoje-si (KR)

( * ) Notice: Subject to any disclaimer, the term of this patent is extended or adjusted under 35 U.S.C. 154(b) by 554 days.

(21) Appl. No.: 18/025,171

(22) PCT Filed: Jan. 17, 2023

(86) PCT No.: PCT/KR2023/000777
§ 371 (c)(1),
(2) Date: Mar. 7, 2023

(87) PCT Pub. No.: WO2023/191280
PCT Pub. Date: Oct. 5, 2023

(65) Prior Publication Data
US 2024/0280221 A1     Aug. 22, 2024

(30) Foreign Application Priority Data
Mar. 31, 2022     (KR) ........................ 10-2022-0040763

(51) Int. Cl.
*F17C 9/00*          (2006.01)
*G01M 3/02*          (2006.01)
(52) U.S. Cl.
CPC ................ *F17C 9/00* (2013.01); *G01M 3/02* (2013.01); *F17C 2205/0323* (2013.01);
(Continued)

(58) Field of Classification Search
CPC ................ F17C 9/00; F17C 2205/0323; F17C 2205/0352; F17C 2221/014;
(Continued)

(56) References Cited

U.S. PATENT DOCUMENTS

2019/0383290 A1     12/2019  Collins
2024/0280221 A1 *    8/2024  Kim .......................... F17C 7/00

FOREIGN PATENT DOCUMENTS

CN          106153275 A  * 11/2016  .............. G01M 3/32
DE     102007035163 A1 *  1/2009  ............... F02B 9/02
(Continued)

OTHER PUBLICATIONS

International Search Report in International Application No. PCT/KR2023/000777, dated Apr. 19, 2023, 2pages.

*Primary Examiner* — Stephanie E Bloss
*Assistant Examiner* — Kevin C Butler
(74) *Attorney, Agent, or Firm* — Park, Kim & Suh, LLC

(57)          ABSTRACT
A nitrogen compression system for a leakage test on a gas pipeline used for an engine according to the present invention includes: a nitrogen generator which is installed on a hull and generates nitrogen; a nitrogen storage tank which stores the nitrogen generated from the nitrogen generator; an air compressor which generates compressed air used to support starting of an engine for propelling the hull and supplies the compressed air to the engine; an air supplier which supplies air to the air compressor; and a first diverter valve which is installed on a first diverter pipeline connecting the air supplier, the nitrogen storage tank, and the air compressor and is controlled to supply any one of air and nitrogen to the air compressor. When the first diverter valve is controlled to supply nitrogen to the air compressor, compressed nitrogen compressed by the air compressor is used to purge a gas pipeline connected to the engine.

12 Claims, 2 Drawing Sheets

(52) U.S. Cl.
CPC ................. *F17C 2205/0352* (2013.01); *F17C 2221/014* (2013.01); *F17C 2221/031* (2013.01); *F17C 2227/0157* (2013.01); *F17C 2265/066* (2013.01); *F17C 2270/0105* (2013.01)

(58) Field of Classification Search
CPC ........ F17C 2221/031; F17C 2227/0157; F17C 2265/066; F17C 2270/0105; G01M 3/02
USPC .......................................... 73/405 A, 40.5 A
See application file for complete search history.

(56) References Cited

FOREIGN PATENT DOCUMENTS

| | | | | | |
|---|---|---|---|---|---|
| EP | 2915986 | A1 | | 9/2015 | |
| EP | 2915986 | B1 | * | 5/2019 | ......... F02D 41/0025 |
| JP | 2004317170 | A | * | 11/2004 | |
| JP | 3628390 | B2 | * | 3/2005 | |
| JP | 2011167602 | A | * | 9/2011 | |
| KR | 10-2004-0100467 | A | | 12/2004 | |
| KR | 100916662 | B1 | * | 9/2009 | ............... G01N 3/12 |
| KR | 101069897 | B1 | * | 10/2011 | ............ B67D 99/00 |
| KR | 20-2014-0004120 | U | | 7/2014 | |
| KR | 20140004120 | U | * | 7/2014 | ............. G01M 3/28 |
| KR | 20-2014-0005774 | U | | 11/2014 | |
| KR | 10-1884766 | B1 | | 8/2018 | |
| KR | 10-2020-0022873 | A | | 3/2020 | |
| KR | 20200022873 | A | * | 3/2020 | ......... F02M 21/0227 |
| KR | 10-2021-0017156 | A | | 2/2021 | |
| KR | 20210017156 | A | * | 2/2021 | ............ F17C 13/025 |
| KR | 102333073 | B1 | * | 12/2021 | ......... F02M 21/0209 |
| KR | 20230055692 | A | * | 4/2023 | ......... B63B 17/0027 |
| KR | 102552635 | B1 | * | 7/2023 | ......... F02M 21/0227 |
| KR | 20240008626 | A | * | 1/2024 | ............. G01M 3/32 |

* cited by examiner

NITROGEN COMPRESSION SYSTEM FOR LEAKAGE TEST ON GAS PIPELINE USED FOR ENGINE AND VESSEL INCLUDING THE SAME

CROSS-REFERENCE TO RELATED APPLICATIONS

This application is the National Stage filing under 35 U.S.C. 371 of International Application No. PCT/KR2023/000777, filed on Jan. 17, 2023, which claims the benefit of Korean Patent Application No. 10-2022-0040763, filed on Mar. 31, 2022, the contents of which are all hereby incorporated by reference herein in their entirety.

TECHNICAL FIELD

The present invention relates to a nitrogen compression system for a leakage test on a gas pipeline used for an engine and a vessel including the same, and more particularly, to a nitrogen compression system for a leakage test on a gas pipeline used for fuel gas applied to a vessel engine and a vessel including the same.

BACKGROUND ART

In general, a ME-GI (high-pressure dual fuel propulsion) engine uses fuel gas which is compressed at high pressure of approximately 300 bar. In this regard, a leakage test is performed for a gas pipeline to secure stability of the gas pipeline and then, fuel gas is applied to the ME-GI (high-pressure dual fuel propulsion) engine.

Recently, there is an attempt on applying a ME-GA (low-pressure dual fuel propulsion) engine as a dual fuel propulsion engine. The ME-GA (low-pressure dual fuel propulsion) engine uses fuel gas at low pressure of 10 through 15 bar and thereby, pressure of the fuel gas in the ME-GA engine is significantly lower than that of in the ME-GI engine.

In the ME-GI (high-pressure dual fuel propulsion) engine, a leakage test for a gas pipeline is performed by using nitrogen (N2) in such a way that nitrogen of approximately 6 bar generated from a nitrogen generator included in a vessel is compressed in a separate compressor at high pressure of approximately 300 bar. Also, in the ME-GA (low-pressure dual fuel propulsion) engine, a leakage test for a gas pipeline is performed after nitrogen of approximately 6 bar generated from a nitrogen generator included in a vessel is compressed in a separate compressor at low pressure of approximately 15 bar. Such a compressor is expensive and has low capacity so that compression time of about 4 hours is needed. Accordingly, the time required to test a leakage of a gas pipeline is increased.

DISCLOSURE

Technical Problem

The present invention provides a nitrogen compression system for a leakage test on a gas pipeline used for an engine by which the time required for the leakage test may be reduced at a low cost, and a vessel including the same.

Technical Solution

A nitrogen compression system for a leakage test on a gas pipeline used for an engine according to an aspect of the present invention includes: a nitrogen generator which is installed on a hull and generates nitrogen; a nitrogen storage tank which stores the nitrogen generated from the nitrogen generator; an air compressor which generates compressed air used to support starting of an engine for propelling the hull and supplies the compressed air to the engine; an air supplier which supplies air to the air compressor; and a first diverter valve which is installed on a first diverter pipeline connecting the air supplier, the nitrogen storage tank, and the air compressor and is controlled to supply any one of air and nitrogen to the air compressor.

Here, when the first diverter valve is controlled to supply nitrogen to the air compressor, compressed nitrogen compressed by the air compressor may be used to purge a gas pipeline connected to the engine.

At this time, an air storage tank, which stores the compressed air generated from the air compressor, and a second diverter valve, which is installed on a second diverter pipeline connecting the air compressor to the air storage tank and is controlled to supply the compressed air to the air storage tank or to supply the compressed nitrogen to the gas pipeline, may be further included.

Also, a first nitrogen decompression valve, which is installed on the first diverter pipeline and reduces pressure of the nitrogen supplied from the nitrogen storage tank to be supplied to the air compressor, may be further included.

Also, an initial purging valve interposed between the second diverter valve and the gas pipeline may be further included.

Here, when the first diverter valve is controlled to supply the nitrogen to the air compressor, the second diverter valve and the initial purging valve may be controlled to discharge the compressed air to the outside.

Also, a second nitrogen decompression valve, which is installed on the gas pipeline disposed at the back end of the initial purging valve and reduces pressure of the compressed nitrogen to be supplied to the gas pipeline, may be further included.

Also, a nitrogen purging valve, which is installed on a nitrogen supply pipeline connecting the nitrogen storage tank to the gas pipeline and supplies the nitrogen stored in the nitrogen storage tank to the gas pipeline, may be further included.

On the other hand, a vessel including a nitrogen compression system for a leakage test on a gas pipeline used for an engine according to another aspect of the present invention includes: a hull; an engine room comprising an engine for propelling the hull; and a fuel supplying room including a fuel supplying system for supplying fuel gas to the engine, wherein the engine room further includes: a nitrogen compression system for a leakage test on a gas pipeline of the fuel supplying system and wherein the nitrogen compression system includes: a nitrogen generator which is installed in the engine room and generates nitrogen; a nitrogen storage tank which stores the nitrogen generated from the nitrogen generator; an air compressor which generates compressed air used to support starting of an engine and supplies the compressed air to the engine; an air supplier which supplies air to the air compressor; and a first diverter valve which is installed on a first diverter pipeline connecting the air supplier, the nitrogen storage tank, and the air compressor and is controlled to supply any one of air and nitrogen to the air compressor.

Here, when the first diverter valve is controlled to supply nitrogen to the air compressor, compressed nitrogen compressed by the air compressor may be used to purge a gas pipeline.

At this time, the nitrogen compression system for a leakage test may further include an air storage tank which stores the compressed air generated from the air compressor; and a second diverter valve which is installed on a second diverter pipeline connecting the air compressor to the air storage tank and is controlled to supply the compressed air to the air storage tank or to supply the compressed nitrogen to the gas pipeline.

Also, the nitrogen compression system for a leakage test may further include a first nitrogen decompression valve which is installed on the first diverter pipeline and reduces pressure of the nitrogen supplied from the nitrogen storage tank to be supplied to the air compressor.

Also, the nitrogen compression system for a leakage test may further include an initial purging valve interposed between the second diverter valve and the gas pipeline.

Here, when the first diverter valve is controlled to supply the nitrogen to the air compressor, the second diverter valve and the initial purging valve may be controlled to discharge the compressed air to the outside.

Also, the nitrogen compression system for a leakage test may further include a second nitrogen decompression valve which is installed on the gas pipeline disposed at the back end of the initial purging valve and reduces pressure of the compressed nitrogen to be supplied to the gas pipeline.

Also, the nitrogen compression system for a leakage test may further include a nitrogen purging valve which is installed on a nitrogen supply pipeline connecting the nitrogen storage tank to the gas pipeline and supplies the nitrogen stored in the nitrogen storage tank to the gas pipeline.

Also, the gas pipeline may include: a main gas pipeline which connects the fuel supplying system to the engine; a first gas pipeline which connects the initial purging valve to the engine and supplies compressed nitrogen used to perform a leakage test before the engine starts to the engine; and a second gas pipeline which connects the first gas pipeline to the main gas pipeline.

On the other hand, the engine may include a ME-GA (low-pressure dual fuel propulsion) engine.

Advantageous Effects

In the nitrogen compression system for a leakage test on a gas pipeline used for an engine and a vessel including the same according to an embodiment of the present invention, the air compressor which supplies compressed air to support starting of the engine to the engine is used to compress nitrogen and thereby, compressed nitrogen is generated. Then, the generated compressed nitrogen is used to perform a leakage test on the gas pipeline. Accordingly, a high-priced compressor for generating compressed nitrogen is not separately needed and thereby, a leakage test may be performed at a low cost.

Also, the air compressor which supplies compressed air used to support starting of the engine to the engine has a capacity greater by 10 times than that of a separate compressor and thereby, the time required for the leakage test on the gas pipeline may be reduced.

MODE FOR INVENTION

Hereinafter, embodiments of the present invention will be described more fully with reference to the accompanying drawings so as to be easily implemented by one of ordinary skill in the art. The present invention may be embodied in many different forms and should not be construed as being limited to the embodiments set forth herein.

Figure 1:
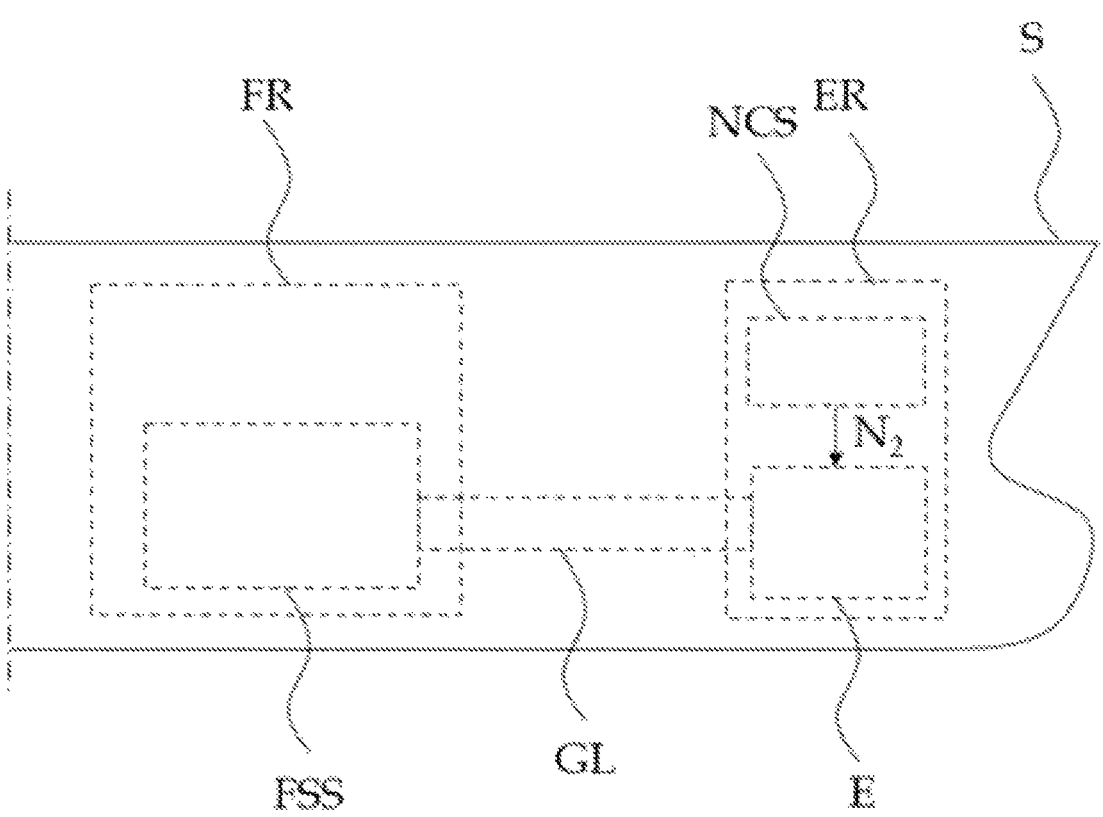
FIG. 1 schematically illustrates a vessel including a nitrogen compression system for a leakage test on a gas pipeline used for an engine according to an embodiment of the present invention.

FIG. 1 schematically illustrates a vessel including a nitrogen compression system for a leakage test on a gas pipeline used for an engine according to an embodiment of the present invention.

As illustrated in FIG. 1, the vessel including a nitrogen compression system NCS for a leakage test on a gas pipeline used for an engine according to an embodiment of the present invention includes a hull S, an engine room ER, and fuel supplying room FR including a fuel supplying system FSS for supplying fuel gas to an engine E.

The hull S may include various hulls such as a container hull and a liquefied gas hull.

The engine room ER may include the engine E for propelling the hull S and the nitrogen (N2) compression system NCS used for a leakage test. The engine E may be the ME-GA (low-pressure dual fuel propulsion) engine which uses fuel gas at low pressure of 10 through 15 bar. The nitrogen (N2) compression system NCS used for a leakage test may perform a leakage test on a gas pipeline GL in such a way that nitrogen N2 for a leakage test of the gas pipeline GL is compressed to generate compressed nitrogen and then, the generated compressed nitrogen is supplied to the gas pipeline GL of the fuel supplying system FSS.

The fuel supplying room FR may include the fuel supplying system FSS which supplies fuel gas to the engine E.

Hereinafter, the nitrogen compression system NCS for a leakage test on a gas pipeline used for an engine according to an embodiment of the present invention will be described in more detail.

Figure 2:
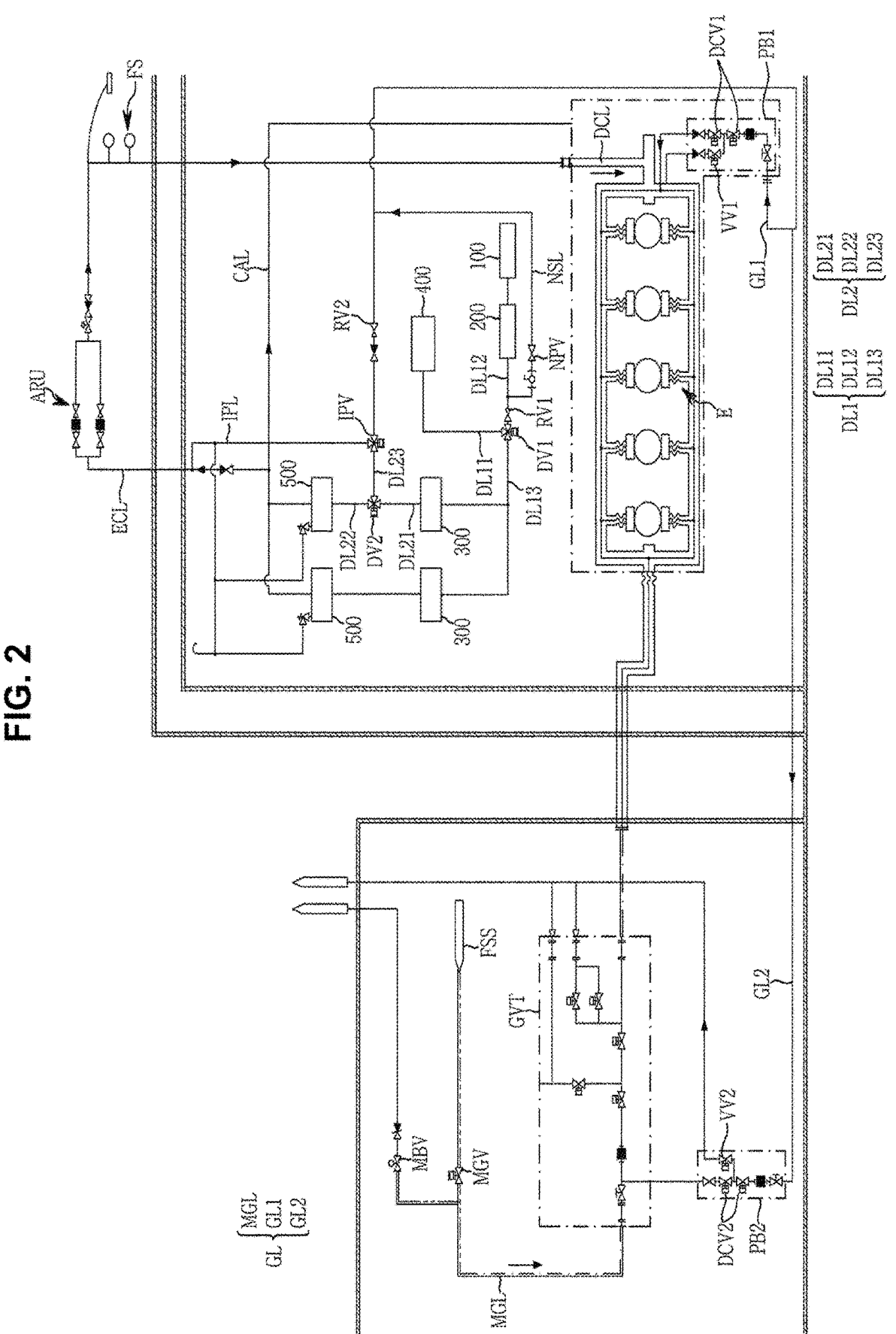
FIG. 2 schematically illustrates a nitrogen compression system for a leakage test on a gas pipeline used for an engine according to an embodiment of the present invention.

FIG. 2 schematically illustrates the nitrogen compression system NCS for a leakage test on a gas pipeline used for an engine according to an embodiment of the present invention.

As illustrated in FIG. 2, the nitrogen compression system NCS for a leakage test on a gas pipeline used for an engine according to an embodiment of the present invention includes a nitrogen generator 100, a nitrogen storage tank 200, an air compressor 300, an air supplier 400, an air storage tank 500, a first diverter valve DV1, a second diverter valve DV2, an initial purging valve IPV, a first nitrogen decompression valve RV1, and a second nitrogen decompression valve RV2.

The nitrogen generator 100 is installed in the engine room ER included in the hull S and may generate nitrogen N2.

The nitrogen storage tank 200 adjacent to the nitrogen generator 100 is installed in the engine room ER and may store nitrogen generated from the nitrogen generator 100. Nitrogen stored in the nitrogen storage tank 200 may have pressure of approximately 6 bar.

The air compressor 300 uses air supplied from the air supplier 400 to generate compressed air which helps in starting and controlling the engine E. The compressed air generated from the air compressor 300 is stored in the air storage tank 500 and then, may be supplied to the engine E through a compressed air pipeline CAL. The compressed air may have pressure of approximately 30 bar. Also, the compressed air may be supplied to a dual circulating pipeline DCL through an engine connecting pipeline ECL which connects the compressed air pipeline CAL to the dual circulating pipeline DCL of the engine E. An air decompression unit ARU and a flow switch FS may be installed on the engine connecting pipeline ECL. The air decompression unit ARU may supply circulating air to the dual circulating pipeline DCL of the engine E, wherein the circulating air is made by compressing and drying compressed air or compressed nitrogen of 30 bar into approximately 0.5 bar. The flow switch FS may identify whether the circulating air passing through the air decompression unit ARU is properly supplied to the dual circulating pipeline DCL of the engine E. When the circulating air is not flowed into the dual circulating pipeline DCL of the engine E, operation of the engine E is stopped.

The air supplier 400 may supply air to the air compressor 300. The air supplier 400 may absorbs an atmosphere and may receive air.

The air storage tank 500 may store compressed air generated from the air compressor 300. The compressed air stored in the air storage tank 500 is supplied to the engine E to assist starting and controlling of the engine E. An amount of the compressed air stored in the air storage tank 500 may be equivalent to an amount that enables the engine to start more than 12 times.

The first diverter valve DV1 may be installed on a first diverter pipeline DL1 which connects the air supplier 400, nitrogen storage tank 200, and the air compressor 300. Such a first diverter valve DV1 may be a 3-way valve. The first diverter pipeline DL1 may include a (1-1)th diverter pipeline DL11, a (1-2)th diverter pipeline DL12, and a (1-3)th diverter pipeline DL13, wherein the (1-1)th diverter pipeline DL11 connects the air supplier 400 to the first diverter valve DV1, the (1-2)th diverter pipeline DL12 connects the nitrogen storage tank 200 to the first diverter valve DV1, and the (1-3)th diverter pipeline DL13 connects the first diverter valve DV1 to the air compressor 300.

As the first diverter valve DV1 is controlled, any one of air and nitrogen may be supplied to the air compressor 300.

In an operation mode when the engine E is operated, the first diverter valve DV1 is controlled to connect the diverter pipeline DL11 to the (1-3)th diverter pipeline DL13. Accordingly, air may be supplied to the air compressor 300 from the air supplier 400 and thereby, compressed air may be generated. In addition, in a still mode when the engine E is stopped, the first diverter valve DV1 is controlled to connect the (1-2)th diverter pipeline DL12 to the (1-3)th diverter pipeline DL13. Accordingly, nitrogen may be supplied to the air compressor 300 from the nitrogen storage tank 200 and thereby, compressed nitrogen may be generated.

The second diverter valve DV2 may be installed on a second diverter pipeline DL2 which connects the air compressor 300 to the air storage tank 500. Such a second diverter valve DV2 may be a 3-way valve. The second diverter pipeline DL2 may include a (2-1)th diverter pipeline DL21, a (2-2)th diverter pipeline DL22, and a (2-3)th diverter pipeline DL23, wherein the (2-1)th diverter pipeline DL21 connects the air compressor 300 to the second diverter valve DV2, the 2-2)th diverter pipeline DL22 connects the second diverter valve DV2 to the air storage tank 500, and the diverter pipeline DL23 connects the second diverter valve DV2 to the initial purging valve IPV.

As the second diverter valve DV2 is controlled, compressed air generated from the air compressor 300 may be supplied to the air storage tank 500 or compressed nitrogen generated from the air compressor 300 may be supplied to the gas pipeline GL.

In an operation mode when the engine E is operated, the second diverter valve DV2 is controlled to connect the (2-1)th diverter pipeline DL21 to (2-2)th diverter pipeline DL22. Accordingly, compressed air generated from the air compressor 300 may be supplied to the air storage tank 500 and thereby, may be supplied to the dual circulating pipeline DCL of the engine E. In addition, in a still mode when the engine E is stopped, the second diverter valve DV2 is controlled to connect the (2-1)th diverter pipeline DL21 to the (2-3)th diverter pipeline DL23. Accordingly, compressed nitrogen generated from the air compressor 300 may be supplied to the gas pipeline GL. Here, a leakage test may be performed on the compressed nitrogen supplied to the gas pipeline GL by purging the gas pipeline GL. The gas pipeline GL may include a main gas pipeline MGL, a first gas pipeline GL1, and a second gas pipeline GL2.

The main gas pipeline MGL may connect the fuel supplying system FSS to the engine E and may supply fuel gas to the engine E from the fuel supplying system FSS. A gas valve train GVT, a main gas valve MGV, and a main venting valve MBV may be installed on the main gas pipeline MGL. The gas valve train GVT may control supply pressure of fuel gas supplied to the engine E. Also, while in a gas trip, the gas valve train GVT may vent fuel gas from the main gas pipeline MGL or purge the main gas pipeline MGL with compressed air. The main gas valve MGV may be installed at the front end of the gas valve train GVT and may block fuel gas supplied to the engine E in case of emergency. The main venting valve MBV may vent or purge fuel gas of the main gas pipeline MGL to the outside.

The first gas pipeline GL1 may connect the initial purging valve IPV to the engine E. The first gas pipeline GL1 may supply compressed nitrogen to the engine E, wherein the compressed nitrogen is used to perform a leakage test before the engine E starts. A first nitrogen purging block PB1 may be installed on the first gas pipeline GL1. In a still mode when the engine E is stopped, the first nitrogen purging block PB1 may be in a valve group which supplies compressed nitrogen to the first gas pipeline GL1 and purges the first gas pipeline GL1. The first nitrogen purging block PB1 may include a first dual control valve DCV1 and a first venting valve VV1, wherein the first dual control valve DCV1 prevents fuel gas to flow backward into the first gas pipeline GL1 and the first venting valve VV1 interposed between the first dual control valves DCV1 vents leakage gas to the outside.

The second gas pipeline GL2 may connect the first gas pipeline GL1 to the main gas pipeline MGL. A second nitrogen purging block PB2 may be installed on the second gas pipeline GL2. The second nitrogen purging block PB2 may be in a valve group which supplies compressed nitrogen to the second gas pipeline GL2 disposed at the front end of the gas valve train GVT to vent, purge, and perform a leakage test on the second gas pipeline GL2. The second nitrogen purging block PB2 may include a second dual control valve DCV2 and a second venting valve VV2, wherein the second dual control valve DCV2 prevents fuel gas to flow backward into the second gas pipeline GL2 and the second venting valve VV2 interposed between the second dual control valves DCV2 vents leakage gas to the outside.

The initial purging valve IPV may be interposed between the second diverter valve DV2 and the first gas pipeline GL1. That is, the initial purging valve IPV may be a 3-way valve which is connected to the (2-3)th diverter pipeline DL23, an initial purging pipeline IPL, and the first gas pipeline GL1.

When the first diverter valve DV1 is controlled to supply nitrogen to the air compressor 300, the second diverter valve DV2 and the initial purging valve IPV may be controlled to discharge compressed air to the outside through the initial purging pipeline IPL for a predetermined time. The initial purging pipeline IPL may be connected to the dual circulating pipeline DCL of the engine E through the engine connecting pipeline ECL. Accordingly, compressed air remaining in the (2-1)th diverter pipeline DL21 and the (2-3)th diverter pipeline DL23 at the beginning may be supplied to the dual circulating pipeline DCL of the engine E through the initial purging pipeline IPL and thereby, a function of the air compressor 300 may be improved. Also, compressed nitrogen may be supplied to the dual circulating pipeline DCL of the engine E through the initial purging pipeline IPL and thereby, a function of the air compressor 300 may be improved.

When the first diverter valve DV1 is controlled to supply air to the air compressor 300, the second diverter valve DV2 and the initial purging valve IPV may be controlled to discharge compressed nitrogen to the outside through the initial purging pipeline IPL for a predetermined time.

The first nitrogen decompression valve RV1 may be installed on the (1-2)th diverter pipeline DL12 of the first diverter pipeline DL1. When pressure of gas acceptable to the air compressor 300 is fixed and the air compressor 300 is not able to receive nitrogen at pressure of 6 bar from the nitrogen storage tank 200, the first nitrogen decompression valve RV1 may reduce pressure of nitrogen supplied from the nitrogen storage tank 200 to the air compressor 300 from 6 bar to atmospheric pressure to be supplied to the air compressor 300.

The second nitrogen decompression valve RV2 may be installed on the gas pipeline GL disposed at the back end of the initial purging valve IPV. The second nitrogen decompression valve RV2 may reduce pressure of compressed nitrogen from 30 bar to 15 bar to be supplied to gas pipelines.

A nitrogen purging valve NPV may be installed on a nitrogen supply pipeline NSL which connects the nitrogen storage tank 200 to the gas pipeline GL. In a still mode when the engine E is stopped or a manual mode, the nitrogen purging valve NPV may supply nitrogen at pressure of 6 bar stored in the nitrogen storage tank 200 to the gas pipeline GL and may purge the gas pipeline GL.

In the nitrogen compression system for a leakage test on a gas pipeline used for an engine according to an embodiment of the present invention described above, the air compressor 300 which supplies compressed air to support starting of the engine E, the first diverter valve DV1, and the second diverter valve DV2 are used to compress nitrogen and thereby, compressed nitrogen is generated. Then, the generated compressed nitrogen is used to perform a leakage test on the gas pipeline GL. Accordingly, a high-priced compressor for generating compressed nitrogen is not separately needed and thereby, a leakage test may be performed at a low cost.

Also, the air compressor 300 which supplies compressed air used to support starting of the engine E to the engine E has a capacity greater by 10 times than that of a separate compressor and thereby, the time required for the leakage test on the gas pipeline GL may be reduced.

In addition, the nitrogen generator 100, the nitrogen storage tank 200, the air compressor 300, the air supplier 400, and the air storage tank 500 are disposed in the engine room ER and thereby, the nitrogen compression system for a leakage test connected to the engine E may be easily formed and arranged.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A nitrogen compression system for a leakage test on a gas pipeline used for an engine comprising:
a nitrogen generator which is installed on a hull and generates nitrogen;
a nitrogen storage tank which stores the nitrogen generated from the nitrogen generator;
an air compressor which generates compressed air used to support starting of an engine for propelling the hull and supplies the compressed air to the engine;
an air supplier which supplies air to the air compressor;
a first diverter valve which is installed on a first diverter pipeline connecting the air supplier, the nitrogen storage tank, and the air compressor and is controlled to supply any one of air and nitrogen to the air compressor, wherein when the first diverter valve is controlled to supply nitrogen to the air compressor, compressed nitrogen compressed by the air compressor is used to purge a gas pipeline connected to the engine;
an air storage tank which stores the compressed air generated from the air compressor;
a second diverter valve which is installed on a second diverter pipeline connecting the air compressor to the air storage tank and is controlled to supply the compressed air to the air storage tank or to supply the compressed nitrogen to the gas pipeline; and
an initial purging valve interposed between the second diverter valve and the gas pipeline.

2. The nitrogen compression system of claim 1, further comprising a first nitrogen decompression valve which is installed on the first diverter pipeline and reduces pressure of the nitrogen supplied from the nitrogen storage tank to be supplied to the air compressor.

3. The nitrogen compression system of claim 1, wherein when the first diverter valve is controlled to supply the nitrogen to the air compressor, the second diverter valve and the initial purging valve are controlled to discharge the compressed air to the outside.

4. The nitrogen compression system of claim 3, further comprising a second nitrogen decompression valve which is installed on the gas pipeline disposed at the back end of the initial purging valve and reduces pressure of the compressed nitrogen to be supplied to the gas pipeline.

5. The nitrogen compression system of claim 4, further comprising a nitrogen purging valve which is installed on a nitrogen supply pipeline connecting the nitrogen storage tank to the gas pipeline and supplies the nitrogen stored in the nitrogen storage tank to the gas pipeline.

6. A vessel comprising:
a hull;
an engine room comprising an engine for propelling the hull; and
a fuel supplying room comprising a fuel supplying system for supplying fuel gas to the engine,
wherein the engine room further comprises a nitrogen compression system for a leakage test on a gas pipeline of the fuel supplying system and wherein the nitrogen compression system comprises:

a nitrogen generator which is installed in the engine room and generates nitrogen;

a nitrogen storage tank which stores the nitrogen generated from the nitrogen generator;

an air compressor which generates compressed air used to support starting of an engine and supplies the compressed air to the engine;

an air supplier which supplies air to the air compressor;

a first diverter valve which is installed on a first diverter pipeline connecting the air supplier, the nitrogen storage tank, and the air compressor and is controlled to supply any one of air and nitrogen to the air compressor, wherein when the first diverter valve is controlled to supply nitrogen to the air compressor, compressed nitrogen compressed by the air compressor is used to purge a gas pipeline;

an air storage tank which stores the compressed air generated from the air compressor:

a second diverter valve which is installed on a second diverter pipeline connecting the air compressor to the air storage tank and is controlled to supply the compressed air to the air storage tank or to supply the compressed nitrogen to the gas pipeline; and an initial purging valve interposed between the second diverter valve and the gas pipeline.

7. The vessel of claim 6, wherein the nitrogen compression system further comprises a first nitrogen decompression valve which is installed on the first diverter pipeline and reduces pressure of the nitrogen supplied from the nitrogen storage tank to be supplied to the air compressor.

8. The vessel of claim 6, wherein when the first diverter valve is controlled to supply the nitrogen to the air compressor, the second diverter valve and the initial purging valve are controlled to discharge the compressed air to the outside.

9. The vessel of claim 8, wherein the nitrogen compression system further comprises a second nitrogen decompression valve which is installed on the gas pipeline disposed at the back end of the initial purging valve and reduces pressure of the compressed nitrogen to be supplied to the gas pipeline.

10. The vessel of claim 9, wherein the nitrogen compression system further comprises a nitrogen purging valve which is installed on a nitrogen supply pipeline connecting the nitrogen storage tank to the gas pipeline and supplies the nitrogen stored in the nitrogen storage tank to the gas pipeline.

11. The vessel of claim 6, wherein the gas pipeline comprises:

a main gas pipeline which connects the fuel supplying system to the engine;

a first gas pipeline which connects the initial purging valve to the engine and supplies compressed nitrogen used to perform a leakage test before the engine starts to the engine; and a second gas pipeline which connects the first gas pipeline to the main gas pipeline.

12. The vessel of claim 6, wherein the engine comprises a ME-GA (low-pressure dual fuel propulsion) engine.

\* \* \* \* \*